H. T. WESTON.
PROCESS OF DESICCATING AIR.
APPLICATION FILED AUG. 25, 1909.
992,829.
Patented May 23, 1911.
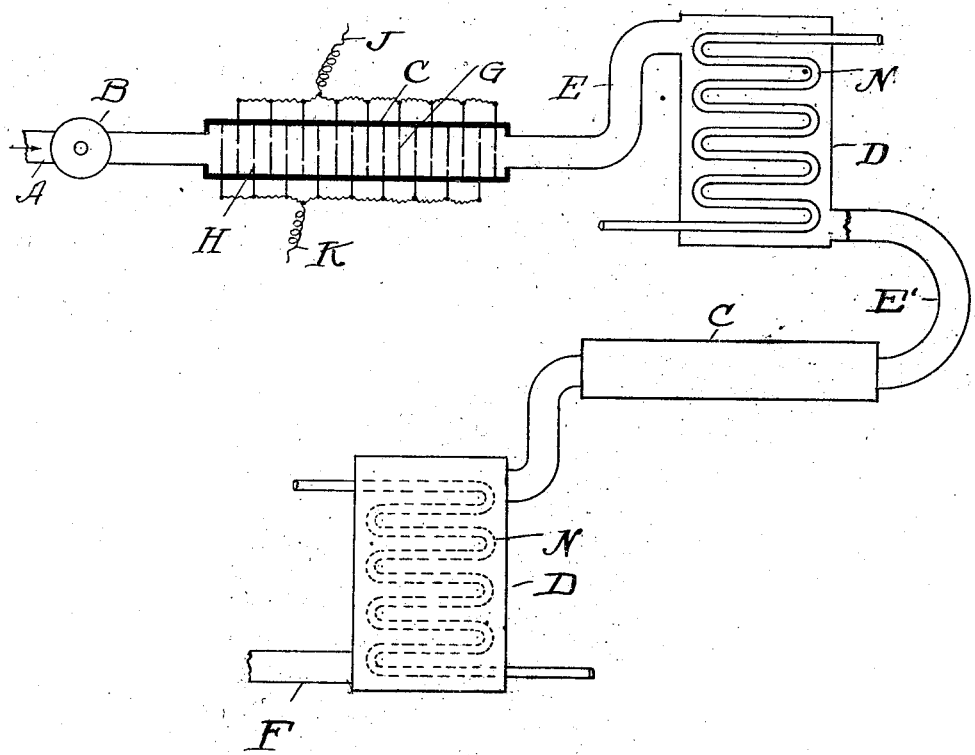
Witnesses.
E. B. Gilchrist.
H. R. Sullivan.
Inventor:
Herbert T. Weston
By Thurston & Woodward
Attorneys

UNITED STATES PATENT OFFICE.

HERBERT T. WESTON, OF CLEVELAND, OHIO.

PROCESS OF DESICCATING AIR.

992,829.

Specification of Letters Patent. Patented May 23, 1911.

Application filed August 25, 1909. Serial No. 514,499.

*To all whom it may concern:*

Be it known that I, HERBERT T. WESTON, a citizen of the United States, residing at Cleveland, in the county of Cuyahoga and State of Ohio, have invented a certain new and useful Improvement in Processes of Desiccating Air, of which the following is a full, clear, and exact description.

It is well known that at ordinary temperatures, particularly during the summer months, the volume of water carried by the air is sufficient to seriously interfere with the successful and satisfactory use of air in various industries. The advantages in these industries of using dry air are thoroughly understood; and in many places apparatus has been installed for the purpose of drying the air prior to use. The air drying processes which the different forms of apparatus heretofore used are designed to carry on, is based wholly on the well known fact that the capacity of air to absorb and hold moisture is decreased as the temperature of the air is decreased. The commonly employed process of desiccating air consists in causing the humid air to flow in contact with refrigerated surfaces, which not only cool the air and thereby cause the release of moisture therefrom, but also cause the released moisture to be condensed upon said surfaces. Thoroughly efficient apparatus for carrying on this process has been devised and installed in many places, but the apparatus is so expensive to install, to maintain and to operate that it has not yet been demonstrated to the satisfaction of every one, that the value of the product justifies the expense of installing and operating the apparatus. The defect in the prevailing process above referred to is that it is based upon and takes into account only one factor upon which the humidity of the air is dependent, viz., its temperature. There is, however, another factor upon which the humidity of the air is dependent which may be termed its hygroscopic tension,—a factor which is known scientifically but which, so far as I know, has not heretofore been utilized in any practical or commercial manner. By hygroscopic tension is meant the capacity of the air at any given temperature to absorb and retain moisture. If, for example, the hygroscopic tension of the air be high, the air at 60° F. for example, will absorb and hold more moisture than it will at the same temperature if the hygroscopic tension be low.

The new process which forms the subject matter of this patent is one that makes practical application of the scientifically known fact that hygroscopic tension of air may be reduced by means of high tension electrical discharges. This is demonstrated in nature by the fact that after such electrical discharges, commonly called lightning, such as accompany thunder storms, the hygroscopic tension of the air is greatly reduced, and correspondingly the humidity of the air is reduced. The fact is also demonstrated in the laboratory experiment, which consists in discharging electrical sparks in a glass container filled with air. After such discharge, much of the moisture in the air is released and is condensed and deposited upon the glass. In the laboratory experiment the condensed moisture will in a comparatively short time be reabsorbed, which shows that the reduction in hygroscopic tension is of only temporary duration. These phenomena, however, do show conclusively that high tension electrical discharges reduce the hygroscopic tension of the air—that is to say, its capacity to retain moisture; and the process now to be described makes practical application of this fact.

My process broadly defined consists in subjecting a flowing stream of air to high tension electrical discharges, whereby its hygroscopic tension is reduced, and in then causing the said air stream to flow over refrigerated surfaces which condense and retain the moisture which is discharged from the air by reason of the said reduction of its hygroscopic tension, as well as the moisture which was discharged from the air by reason of its reduction in temperature.

For use in industrial processes large volumes of desiccated air are required. It is not probable that when large volumes are being treated the electrical discharge at any one place past which the air stream flows will produce a sufficient reduction of the hygroscopic tension. The process, therefore, in a more specific and more practical form consists in repeating the described operations in series as stated as many times as may be necessary to practically produce the required degree of desiccation of the air.

The described treatment of the air not only desiccates it, but produces, also, other changes of condition which increases its industrial value. The electrical discharges transform some of the oxygen into ozone, wherefore the treated air will be more active as an oxidizer. The electrical discharges may also cause some of the inert nitrogen in the air to become active, wherefore it will combine with the oxygen or ozone to form nitric acid gas. This result, however, will follow only when the discharges are such as will produce an arc. If silent or cold discharges are employed, there will be no production of nitric acid. A substantial quantity of the acid may be recovered by well known methods. In fact much of it will be absorbed by the water resulting from the condensation of the moisture drawn from the air.

The drawing shows diagrammatically an apparatus for the practice of the described process. In this apparatus A represents the air intake pipe; B a fan for driving the air through the apparatus; C electrical discharge chambers; D refrigeration chambers; E' conduits connecting a chamber C with a chamber D, and F the conduit through which the air after treatment is conducted to a point of use.

In each chamber C there may be a multitude of metallic points G, all connected with a conductor J which leads from a producer of high tension electrical current. Opposed to these points G are other points H, all connected with a return conductor K. A shower of sparks is caused to flow continuously from points G to points H across the air stream flowing through chamber C.

The refrigerating chambers may contain refrigerating coils N over which the air will flow; and these coils may be refrigerated by any suitable or familiar method. It is not necessary however to reduce the temperature of the air by as much as is required in the old desiccating process to reduce it to the same degree of dryness.

The apparatus may be made up of any desired number of units, each comprising an electrical chamber, a refrigerating chamber, and a connecting conduit; and these units may be connected in series as stated by conduits E'. How many of these units will be required depends upon the capacity and efficiency of the units, and the quality of the product required. It will however generally require the employment of more than one unit to produce economically air desiccated to a degree required for most industrial purposes. It is to be understood however that the described process may be practiced with any suitable apparatus.

Having described my invention, I claim;

1. The process of treating air for industrial uses, which consists in passing high tension electrical discharges through a flowing stream of air, thereby causing a reduction of the hygroscopic tension of the air, and in then causing said air stream to flow through a closed chamber over refrigerated surfaces therein whereby moisture released from the air is condensed.

2. The process of treating air for industrial uses, which consists in passing high tension electrical discharges through a flowing stream of air, thereby causing a reduction of the hygroscopic tension of the air, and in then causing said air stream to flow through a closed chamber over refrigerated surfaces therein whereby moisture released from the air is condensed, and in repeating these operations in series as stated.

In testimony whereof, I hereunto affix my signature in the presence of two witnesses.

HERBERT T. WESTON.

Witnesses:
H. R. SULLIVAN,
E. L. THURSTON.